United States Patent
Bailey

[11] Patent Number: 5,669,407
[45] Date of Patent: Sep. 23, 1997

[54] COMPRESSION CARTRIDGE FOR A FAUCET VALVE ASSEMBLY

[75] Inventor: Robert W. Bailey, London, Canada

[73] Assignee: Masco Corporation of Indiana, Indianapolis, Ind.

[21] Appl. No.: 549,845

[22] PCT Filed: Mar. 24, 1994

[86] PCT No.: PCT/US94/03200

§ 371 Date: Mar. 11, 1996

§ 102(e) Date: Mar. 11, 1996

[87] PCT Pub. No.: WO95/25918

PCT Pub. Date: Sep. 28, 1995

[51] Int. Cl.⁶ .................................................. F16K 11/02
[52] U.S. Cl. .................................. 137/359; 137/454.5
[58] Field of Search ................................... 137/359, 360, 137/454.5, 801, 315

[56] References Cited

U.S. PATENT DOCUMENTS

| Re. 30,559 | 3/1981 | Schmitt. |
|---|---|---|
| 2,740,130 | 4/1956 | Stone. |
| 3,082,786 | 3/1963 | McLean. |
| 3,481,360 | 12/1969 | Gillberg. |
| 3,789,870 | 2/1974 | Keller, III. |
| 3,911,946 | 10/1975 | Humpert et al.. |
| 4,037,623 | 7/1977 | Beswick. |
| 4,183,501 | 1/1980 | Flynn. |
| 4,290,445 | 9/1981 | Turner. |
| 4,408,745 | 10/1983 | Swiers et al.. |
| 4,678,002 | 7/1987 | Valley. |
| 4,747,428 | 5/1988 | Crawford et al.. |
| 4,821,765 | 4/1989 | Iqbal et al.. |
| 4,903,725 | 2/1990 | Ko. |
| 5,014,736 | 5/1991 | Körfgen et al.. |
| 5,094,258 | 3/1992 | Orlandi. |
| 5,107,884 | 4/1992 | Orlandi. |
| 5,113,898 | 5/1992 | White et al.. |
| 5,135,022 | 8/1992 | Kovey et al.. |
| 5,176,168 | 1/1993 | Stoll et al.. |
| 5,232,008 | 8/1993 | Jeffress et al.. |
| 5,255,704 | 10/1993 | Bennett .................................. 137/454.5 |

FOREIGN PATENT DOCUMENTS

PCT/US94/
03200  3/1994  WIPO.

*Primary Examiner*—Kevin Lee
*Attorney, Agent, or Firm*—Myron B. Kapustij; Malcolm L. Sutherland

[57] ABSTRACT

A valve and cover plate construction for mounting a valve assembly in a plastic faucet cover plate and for securing the plate to a deck of a sink. The valve and cover plate construction comprise an annular seat formed inside of a flange in the cover plate in which the valve is disposed, a plastic split annular retaining washer adapted to be seated on annular seat, and an annular flange having an abutting surface on the bonnet of the valve assembly adapted to abut against the top of the retaining washer and press it against the seat when the valve assembly is inserted into the flange of the cover plate. The bonnet also has an annular flange having an undercut in its bottom into which is inserted a sealing member such as an O-ring. The sealing member is encapsulated on three sides by the material forming the bonnet.

6 Claims, 2 Drawing Sheets

5,669,407

COMPRESSION CARTRIDGE FOR A FAUCET VALVE ASSEMBLY

FIELD OF THE INVENTION

This invention relates to valve assemblies for faucets and the like and to means for mounting said assemblies to cover plates or escutcheons, particularly those made of plastic.

BACKGROUND OF THE INVENTION

Valve assemblies comprised of bonnets and stems and their use with plastic cover plates or escutcheons are known and are disclosed, for example, in U.S. Pat. No. 3,789,870. However, the conventional means for mounting these valve assemblies to plastic cover plates are generally unsatisfactory because they produce excessive strains and stresses on the cover plate. These stresses and strains sometimes result in cracking of the cover plate. Furthermore, the conventional means for mounting these valve assemblies are inefficient in production as they require the use of threaded hold down rings which require special attention to reduce cross threading. Eliminating these rings traditionally would have meant either a loose escutcheon or excessive stresses and strains which could lead to cracking of the cover.

The present invention provides a means of mounting valve assemblies to plastic cover plates without the production of excessive stresses and strains of conventional mounting systems. Furthermore, the instant invention also permits the snap fit assembly of the underbodies, cover plate, and retaining washer after the underbody assembly has been suitably tested for leakage.

SUMMARY OF THE INVENTION

The instant invention provides a valve assembly comprised of a bonnet and stem having sealing means comprised of a circumferentially extending flange on the bonnet. The flange has an undercut providing a generally U-shaped space into which is inserted a sealing member such as an O-ring. The sealing member is encapsulated in this U-shaped space and is surrounded on three sides by the metal of the flange.

The instant invention further provides an improved means for mounting the valve assembly to a plastic cover plate and simultaneously securing the cover plate to the deck of a faucet or the like. The improved means comprises an annular split retaining washer which is disposed in an annular seat in the interior of a valve assembly receiving flange in the cover plate. The retaining washer is forced against the seat by a shoulder formed on the underside of a flange in the bonnet. The cover plate is thus secured to the deck of a sink or the like.

DESCRIPTION OF THE PREFERRED EMBODIMENT

Figure 1:
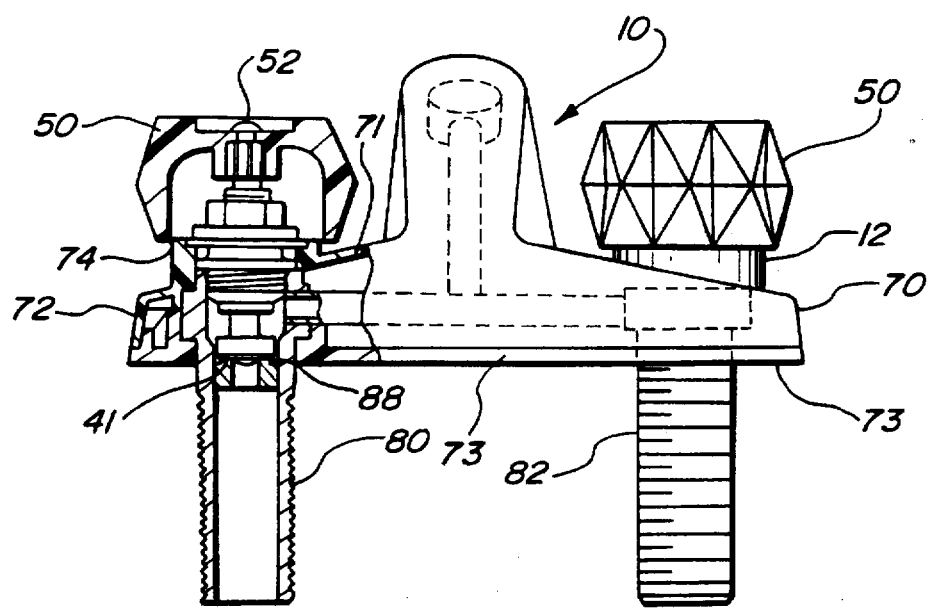
FIG. 1 is a rear elevational view partially in section of the assembled valve assembly and cover plate.
Figure 2:
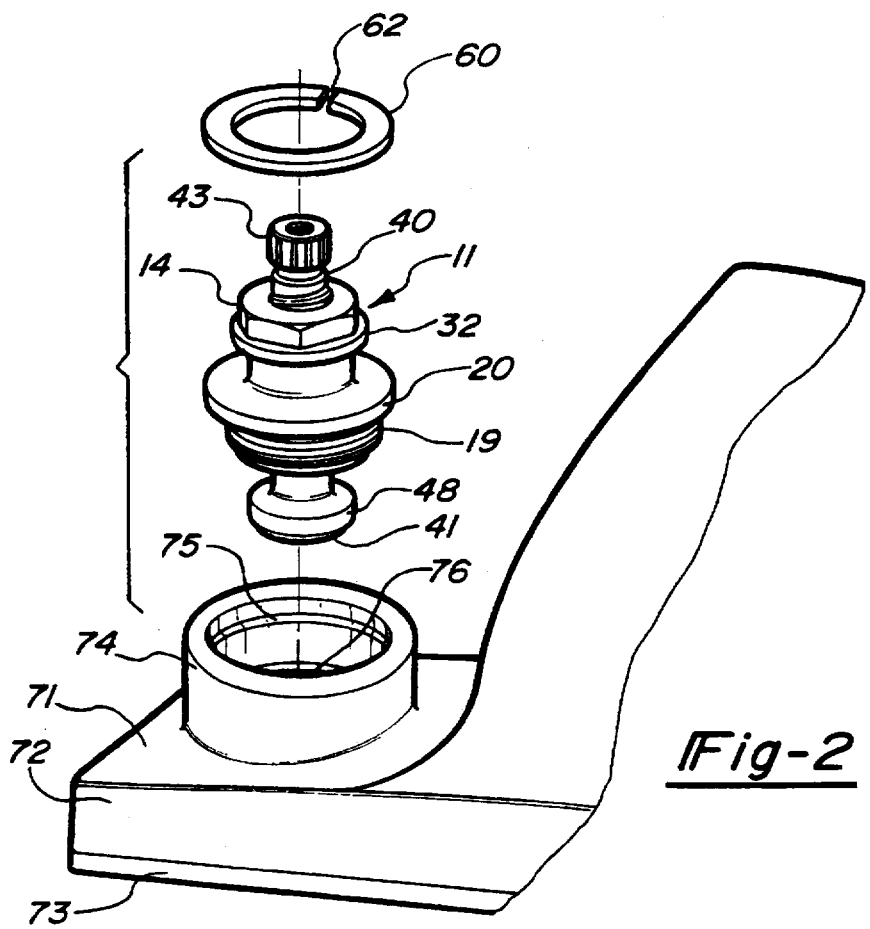
FIG. 2 is an exploded perspective view of the valve assembly, retaining ring, and part of the cover plate.
Figure 3:
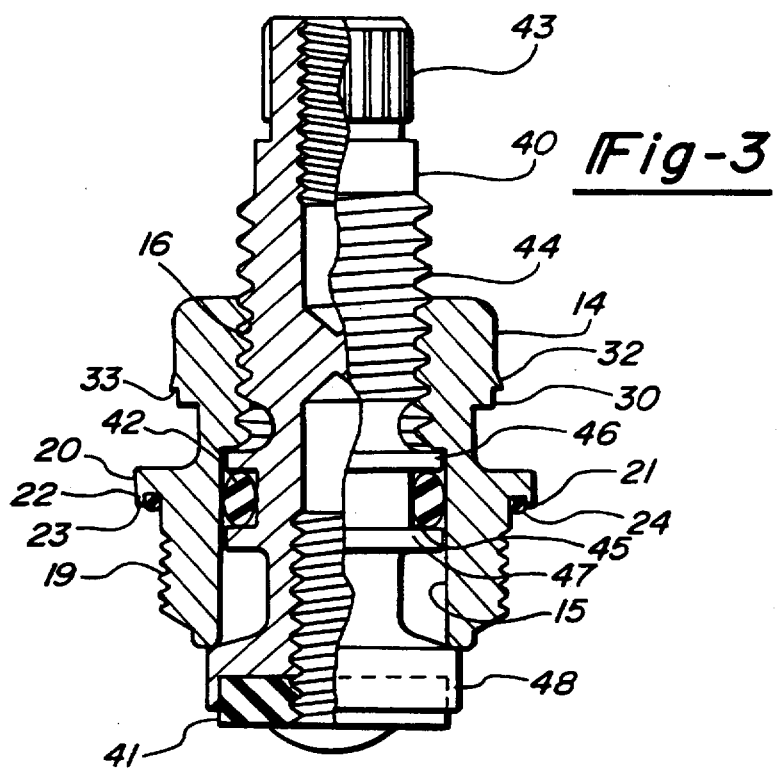
FIG. 3 is a side elevational view in section of the valve assembly comprised of the bonnet and stem.

Referring to FIG. 1 there is illustrated a mixing faucet assembly 10 having a pair of spaced apart valve assemblies 11 and 12. Valve assemblies 11 and 12 are generally identical. Since both valve assemblies are generally identical only one will be described in detail. One valve assembly is disposed in underbody 80 while the other valve assembly is disposed in underbody 82. One valve assembly controls the flow of hot water while the other controls the flow of cold water. Each underbody 80, 82 has a central passageway 84 extending therethrough and is provided with an externally threaded portion 86. Central passageway 84 has an internally threaded portion 85 adjacent its top end. A waterway 94 connects the two underbodies. A spout tube 95 is connected to waterway 94. The underbodies 80, 82 have port means 87 comprising an aperture which communicate with waterway 90. Underbodies 80, 82 also have valve seats 88 disposed in passageway 84.

The valve assembly 11 includes a hollow bonnet 14 having a central bore 15 which has an internally threaded portion 16 adjacent its top end 17. The bore 15 has a relatively smooth portion 18 beneath the threaded portion 16 for reception of an O-ring 42.

The bonnet 14 has external threads 19 adjacent its bottom end. These external threads engage internally threaded portion 85 of underbody 80 to threadedly secure bonnet 14 in underbody 80. A flange 20 extends circumferentially around the exterior of bonnet 14. The flange 20 contains an undercut 21 which forms downwardly extending outer rim 22 of the flange having an undersurface 23. A flexible sealing element 24 such as an O-ring is disposed in undercut 21. This sealing element 24 is thus encapsulated on the top and both sides.

Figure 4:
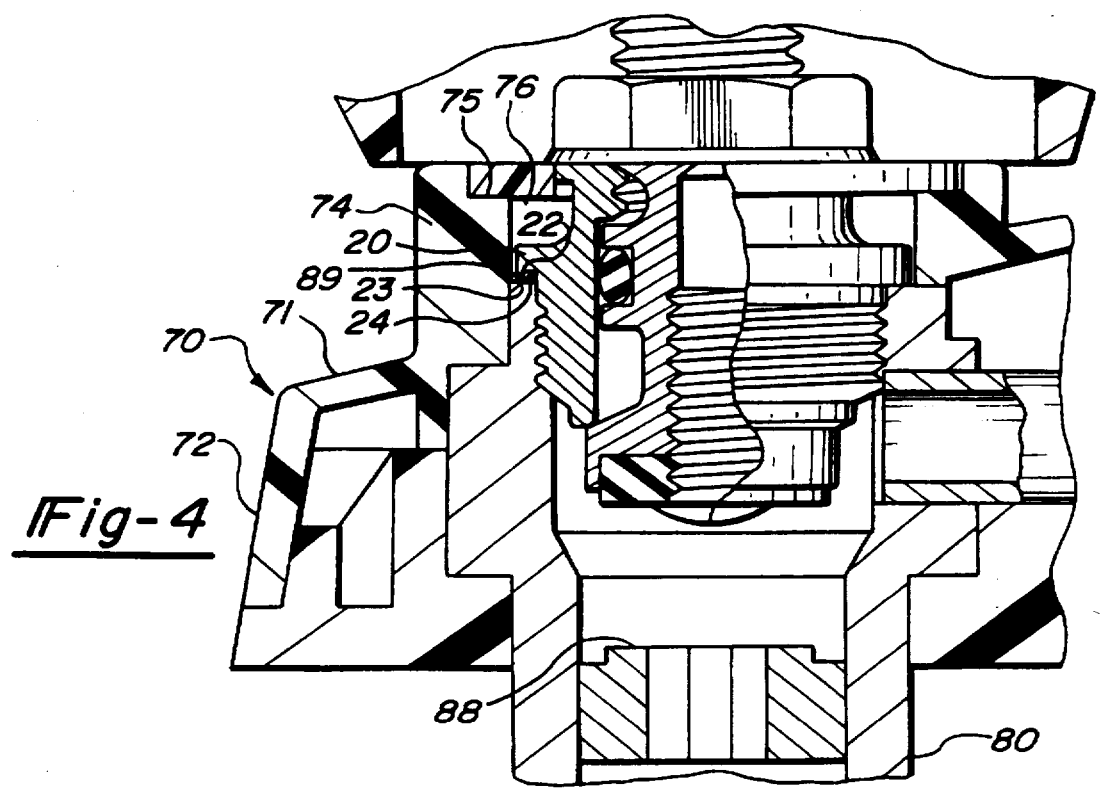
FIG. 4 is a partial side elevational view in section of the valve assembly mounted in the cover plate.

When the bonnet 14 is fully screwed into the underbody 80 the sealing element 24 forms a seal with the top annular edge 89 of underbody 80. Furthermore, as best seen in FIG. 4, the undersurface 23 of rim 22 abuts tightly against the top annular edge 89 thereby also forming a seal with top annular edge 89.

The bonnet 14 also has an annular raised section 30 having a larger outer diameter than the diameter of the relatively smooth section 31 immediately below raised section 30. A circumferentially extending abutment means or flange 32 is provided immediately above raised section 30. The flange 32 has a shoulder 33 formed in the lower surface thereof. The outer surface of flange 32 is beveled from top toward bottom having a smaller outer diameter at the top and a larger outer diameter at the bottom. This outer shape of flange 32 facilitates the mounting of the retaining washer 60 on the bonnet 14. The shoulder 33, as more fully described infra, abuts against retaining washer 60 to keep cover 70 secured to the deck of a sink or the like.

A stem 40 has a valve disc 41 at the lower end thereof and a handle receiving means, such as a spline 43, at the upper end thereof. The valve disc 41 is preferably comprised of a flexible sealing material such as rubber and is disposed in a valve disc housing 48. The valve disc 41 is brought into sealing engagement with valve seat 88 in underbody 80.

A handle is conventionally received on spline 43 of stem 40 by engagement of its cylindrical hub with the spline and is retained thereon with the aid of a screw 52.

The stem 40 also has a threaded portion 44 below the spline 43 adapted to engage internally threaded portion 16 of bore 15 of the bonnet 14. An O-ring 42 is disposed in an annular recess 45 formed by two axially spaced apart annular ridges 46 and 47. The ridges 46, 47 are located intermediate valve disc housing 48 and threaded portion 44.

In assembly of the valve assembly 11 the O-ring 42 is placed on stem 40 and the bonnet 14 is then slipped over splined end 43. The bonnet 14 and stem 40 are assembled by engagement of the threads of the externally threaded portion 44 of stem 40 with the threads of the internally threaded portion 16 of bonnet 14. Axial movement of stem 40 in the bonnet 14 is accomplished by rotation of the stem 40. Axially downward movement of stem 40 results in valve disc 41 sealing engaging valve seat 88 thereby shutting off the flow of water. Axially upward movement of stem 40 in bonnet 14 and in underbody 80 disengages valve disc 41 from valve seat 88 thereby allowing the flow of water through valve seat 88. FIG. 1 illustrates the valve in the closed position with the stem 40 in the fully extended down position while FIG. 4 illustrates the valve in the open position with the stem 41 in a fully up or retracted position.

The escutcheon or cover plate 70, preferably made of plastic comprises a top wall 71 and side walls 72. A snap-in bottom closure member 73, preferably made of plastic, is provided. To receive an individual valve assembly 11 the cover 70 has upstanding flanges 74 having an internal annular seat 75 adapted to receive split retaining washer 60. Annular seat 75 circumscribes opening 76.

Washer 60 is comprised of a suitable plastic material, preferably an engineering resin or resin blend such as celcon. The washer 60 is designed to flex slightly thereby relieving the load on the cover 70 insofar as the washer is placed in shear. Washer 60 has a radially extending slit 62 to enable removal and installation onto the bonnet 14. In the installation of the valve assembly 11 in cover plate 70 washer 60 is slipped over the top of bonnet 14 and over flange 32. The valve assembly 11 with the washer thereon is inserted through the opening 76 in flange 74 with the bonnet 14 being screwed into underbody 80 which is attached, such as by snap or interference fit, to cover 70. As the bonnet is screwed into underbody 80 shoulder 33 of flange 32 abuts washer 60 which is seated in seat 75 and forces it against seat 75. This locks or secures the cover plate 70 to the deck.

I claim:

1. An improved valve and cover plate construction comprising:

a cover plate;

an underbody having an axial bore, a top annular edge, a valve seat disposed below said top annular edge, and a valve assembly comprising a hollow bonnet and a stem movably disposed in said bonnet, a valve disc disposed at the bottom of said stem adapted to cooperate with said valve seat to regulate the fluid flow through said valve seat, said bonnet being fixedly disposed in said axial bore and said stem axially movable in said bonnet, the improvement comprising said bonnet having a first annular flange extending circumferentially therearound, said first flange having an undercut therein and a sealing element disposed in said undercut, said undercut being generally U-shaped and forming a downwardly extending outer rim having an undersurface on a radially outer edge of said flange adapted to sealingly engage at least a portion of said top annular edge of said underbody, and a second flange having an abutment surface on the bottom thereof disposed above said first flange, and said cover plate having at least one flange having an opening therethrough adapted to receive said valve assembly, said flange having an annular seat circumscribing said opening and adapted to seat a retaining ring.

2. The construction of claim 1 wherein said sealing element is an O-ring.

3. The construction of claim 1 wherein said cover plate is comprised of plastic.

4. The construction of claim 1 wherein said retaining ring is split.

5. An improved valve and cover plate construction comprising:

a cover plate, an underbody having an axial bore, a top edge, and a valve seat disposed below said top edge, and a valve assembly comprising a hollow bonnet and a stem movably disposed in said bonnet with a valve disc disposed at the bottom of said stem adapted to cooperate with said valve seat to regulate fluid flow, said bonnet being fixedly disposed in said axial bore and said stem axially movable in said bonnet, the improvement comprising said bonnet having a first annular flange extending circumferentially therearound, said first flange having an undercut therein and a sealing element disposed in said undercut, said undercut being generally U-shaped and forming a downwardly extending outer rim having an undersurface on a radially outer edge of said flange adapted to sealingly engage at least a portion of said top edge of said underbody, and a second annular flange having an abutment surface on the bottom thereof, and said cover plate having at least one flange having an opening therethrough adapted to receive said valve assembly, said flange having an annular seat circumscribing said opening and adapted to seat a retaining ring, wherein said retaining ring is pressed against said annular seat by said abutment surface.

6. The construction of claim 5 wherein said second flange has an inclined outer surface to facilitate said retaining ring being pushed downwardly over said second flange.

* * * * *